United States Patent
Chen (10) Patent No.: US 10,445,284 B2
(45) Date of Patent: Oct. 15, 2019

(54) DISPLAY APPARATUS, SIGNAL TRANSMITTER, AND DATA TRANSMITTING METHOD FOR DISPLAY APPARATUS

(71) Applicant: Novatek Microelectronics Corp., Hsinchu (TW)

(72) Inventor: Min-Jung Chen, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 383 days.

(21) Appl. No.: 15/187,806

(22) Filed: Jun. 21, 2016

(65) Prior Publication Data
US 2017/0364471 A1 Dec. 21, 2017

(51) Int. Cl.
| G06F 13/42 | (2006.01) |
| G06F 1/3296 | (2019.01) |
| G06F 13/16 | (2006.01) |
| G06F 13/40 | (2006.01) |
| G06F 1/3234 | (2019.01) |

(52) U.S. Cl.
CPC ........ *G06F 13/4286* (2013.01); *G06F 1/3253* (2013.01); *G06F 1/3296* (2013.01); *G06F 13/1673* (2013.01); *G06F 13/4022* (2013.01); *Y02D 10/151* (2018.01)

(58) Field of Classification Search
CPC .............. G06F 13/4286; G06F 1/3296; G06F 13/1673; G06F 13/4022
See application file for complete search history.

(56) References Cited

U.S. PATENT DOCUMENTS

| 6,756,951 B1 * | 6/2004 | Ishizuka ............. G09G 3/3216 315/169.1 |
| 8,300,033 B2 | 10/2012 | Nam et al. |
| 8,441,426 B2 | 5/2013 | Chung et al. |
| 9,269,302 B2 | 2/2016 | Gu et al. |

(Continued)

FOREIGN PATENT DOCUMENTS

| CN | 101814317 | 8/2010 |
| CN | 101882414 | 11/2010 |

(Continued)

OTHER PUBLICATIONS

"Office Action of Taiwan Counterpart Application," dated Dec. 14, 2017, p. 1-p. 10, in which the listed references were cited.

*Primary Examiner* — Jing-Yih Shyu
(74) *Attorney, Agent, or Firm* — JCIPRNET (57) ABSTRACT

A signal transmitter of the invention is coupled to a plurality of signal receivers by a bus, and is configured to transmit display data through the bus for displaying a line. The signal transmitter includes a first data sequence and a second data sequence. The first data sequence has an electronic characteristic of a first value and is transmitted to a first signal receiver of the signal receivers, and the second data sequence has the electronic characteristic of a second value and is transmitted to a second signal receiver of the signal receivers. Wherein, a first signal transmission path from the signal transmitter to the first signal receiver is shorter than a second signal transmission path from the signal transmitter to the second signal receiver, and the first value is larger than the second value.

11 Claims, 5 Drawing Sheets

(56) References Cited

U.S. PATENT DOCUMENTS

| | | | |
|---|---|---|---|
| 2006/0203138 A1* | 9/2006 | Chen | G09G 3/3611 |
| | | | 349/39 |
| 2007/0195048 A1* | 8/2007 | Nam | G09G 3/3611 |
| | | | 345/98 |
| 2008/0291181 A1* | 11/2008 | Nam | G09G 3/3611 |
| | | | 345/204 |
| 2011/0025697 A1* | 2/2011 | Chen | H04L 25/14 |
| | | | 345/520 |
| 2014/0009450 A1 | 1/2014 | Su et al. | |
| 2014/0204070 A1* | 7/2014 | Lin | G09G 3/3677 |
| | | | 345/212 |
| 2014/0368416 A1* | 12/2014 | Gu | G09G 3/3233 |
| | | | 345/78 |
| 2015/0213753 A1* | 7/2015 | Lin | G09G 3/2096 |
| | | | 345/214 |

FOREIGN PATENT DOCUMENTS

| | | |
|---|---|---|
| CN | 101312003 | 8/2012 |
| CN | 103927968 | 7/2014 |

* cited by examiner

DISPLAY APPARATUS, SIGNAL TRANSMITTER, AND DATA TRANSMITTING METHOD FOR DISPLAY APPARATUS

BACKGROUND

Field of the Invention

The invention is directed to a signal transmitter of a display apparatus and more particularly, to the signal transmitter to transmit display data with electronic characteristic which can be adjusted dynamically.

Description of Related Art

In conventional art, in a display apparatus, display data is transmitted to a plurality of source drivers by a signal transmitter. In a layout of the display apparatus, distances between the source drivers and the signal transmitter are not the same. In the art, the source driver near the signal transmitter is called a near-end signal receiver, and the source driver far from the signal transmitter is called a far-end signal receiver.

When the display data is transmitted to the near-end signal receiver, quality of the display data received by the near-end signal receiver is low because of a signal reflection effect. For improving the quality of the display data, the conventional art enlarges voltage or current swing of the display data or enables a pre-emphasis function. But, when the display data is transmitted to the far-end signal receiver, the enlarged voltage or current swing or the enabled pre-emphasis function are no more necessary, and the output power of the signal transmitter is wasted.

SUMMARY

The invention provides a signal transmitter and signal transmitting method thereof which can save power consumption for data transmission.

The invention also provides a display apparatus using the signal transmitter mentioned above, and the display apparatus can save power consumption for display data transmission.

The signal transmitter of the invention is coupled to a plurality of signal receivers by a bus, and is configured to transmit display data through the bus for displaying a line. The signal transmitter includes a first data sequence and a second data sequence. The first data sequence has an electronic characteristic of a first value and is transmitted to a first signal receiver of the signal receivers, and the second data sequence has the electronic characteristic of a second value and is transmitted to a second signal receiver of the signal receivers. Wherein, a first signal transmission path from the signal transmitter to the first signal receiver is shorter than a second signal transmission path from the signal transmitter to the second signal receiver, and the first value is larger than the second value.

The display apparatus of the invention includes a display panel, a plurality of signal receivers, and a signal transmitter. The signal receivers are coupled in series and respectively provide a plurality of source driving signals to drive the display panel. The signal transmitter is coupled to the signal receivers by a bus, and the signal transmitter is configured to transmit display data for displaying a line through the bus, wherein the display data includes a first data sequence having an electronic characteristic of a first value and be transmitted to a first signal receiver of the signal receivers, and a second data sequence having the electronic characteristic of a second value and be transmitted to a second signal receiver of the signal receivers.

The present invention also provides the data transmitting method for a display apparatus, step of the data transmitting method includes: transmitting display data through the bus for displaying a line, the display data including a first data sequence having an electronic characteristic of a first value to a first signal receiver of the signal receivers and a second data sequence having the electronic characteristic of a second value to a second signal receiver of the signal receivers; and, setting the first value larger than the second value if a first signal transmission path from the signal transmitter to the first signal receiver is shorter than a second signal transmission path from the signal transmitter to the second signal receiver.

To sum up, in the invention, the electronic characteristics of the data sequences can be determined by distances of the signal transmission paths. That is, an output power of the data transmitter can be adjusted dynamically according to the transmission distance between a target signal receiver and the signal transmitter, and the output power of the signal transmitter can be optimized.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
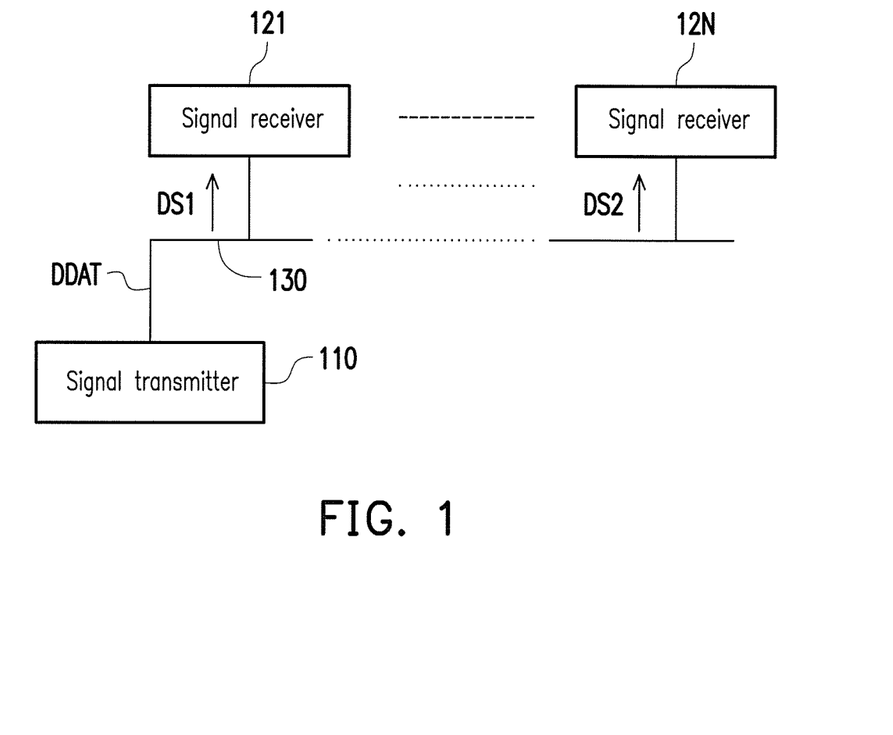
FIG. 1 illustrates a block diagram of a signal transmitter according to an embodiment of present disclosure.

Referring to FIG. 1, FIG. 1 illustrates a block diagram of a signal transmitter according to an embodiment of present disclosure. The signal transmitter 110 is coupled to a plurality of signal receivers 121-12N by a bus 130, and the signal transmitter 110 is used to transmit display data DDAT to the signal receivers 121-12N through the bus 130. In this embodiment, the signal transmitter 110 may be installed in a timing controller, and the signal receivers 121-12N may be installed in corresponding source drivers which drive a display panel to display a line according to the display data DDAT. For example, 24-bpp (bits per pixel) display data DDAT includes data displayed by R/G/B sub-pixels of 8/8/8 bits. The display data DDAT can be counted by pixels or sub-pixels. A signal transmission path from the signal transmitter 110 to the signal receiver 121 is shorter than a signal transmission path from the signal transmitter 110 to the signal receiver 12N.

In this embodiment, the display data DDAT includes a first data sequence DS1 and a second data sequence DS2. The first data sequence DS1 and the second data sequence DS2 are information which respectively be carried on the bus 130 within two different time periods, and the first data sequence DS1 is received by the signal transmitter 121, and the second data sequence DS2 is received by the signal transmitter 12N. The information of the first data sequence DS1 may be used to drive a first part of the display panel, and the information of the second data sequence DS2 may be used to drive a second part of the display panel. It should be noted here, the first data sequence DS1 has an electronic characteristic of a first value to the signal receiver 121 and the second data sequence DS2 has the electronic characteristic of a second value to a signal receiver 12N. In this embodiment, the first value and the second value are different, and the first value may be larger than the second value. Please note that the first data sequence DS1 to the signal receiver 121 which has the shortest signal transmission path to the signal transmitter 110 and the second data sequence DS2 to the signal receiver 12N which has the longest signal transmission path to the signal transmitter 110 are illustrated in FIG. 1 as one of examples; and in another embodiment, the first data sequence DS1 may be transmitted to a signal receiver which has a relatively shorter signal transmission path to the signal transmitter 110, and the second data sequence DS2 may be transmitted to a signal receiver which has a relatively longer signal transmission path to the signal transmitter 110.

It can be seen here, the values of electronic characteristic of the first and second data sequence DS1, DS2 on the bus 130 are not the same, and can be adjusted according to transmission distances of the first and second data sequence DS1, DS2. That is, power consumption of the signal transmitter 110 can be optimized, and a power saving concept can be achieved.

In the embodiment, the electronic characteristic of each of the data sequences DS1 and DS2 includes one of a source current, a sink current and a voltage swing of the data signal DDAT.

About the detail operation of the signal transmitter 110, the signal transmitter 110 may count the display data DDAT to obtain a count value, which indicates the number of pixels (or sub-pixels) that the display data DDAT can drive, and the signal transmitter 110 generates the data sequences DS1 and DS2 respectively having the electronic characteristic of the values determined according to the count value. Counting the display data DDAT can identify which signal receiver a currently transmitted data sequence being transmitted to. On the other side, each of the signal receivers 121-12N receives a data sequence for driving a certain number of pixels (or sub-pixels).

For example, in FIG. 1, when the signal transmitter 110 transmits the first data sequence DS1 with a voltage swing 400 mV (as the electronic characteristic of the determined value) to the signal receiver 121, the signal transmitter 110 also counts the display data DDAT to obtain the count value, simultaneously. The signal transmitter 110 may determine whether a data transmission operation of the first data sequence DS1 is complete or not by comparing the count value and a first threshold value. If the count value reaches the first threshold value, the data transmission operation of the first data sequence DS1 is determined to be complete, and the signal transmitter 110 may adjust the value of the voltage swing (as the electronic characteristic) of the data signal DDAT to be 300 mV for subsequent data transmission operation of the another data sequence to a next signal receiver, the signal receiver 122 (not shown). Voltage swing can be adjusted by controlling the source current and the sink current to the signal receiver.

Figure 2:
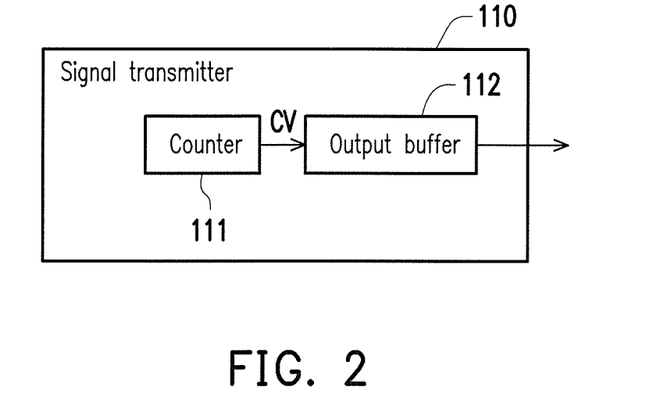
FIG. 2 illustrates a block diagram of the signal transmitter according to the embodiment in FIG. 1.

Referring to FIG. 2, FIG. 2 illustrates a block diagram of the signal transmitter according to the embodiment in FIG. 1. The signal transmitter 110 includes a counter 111 and an output buffer 112. The counter 111 is used to count the display data DDAT to obtain the count value CV. The output buffer 112 is coupled to the counter 111. The output buffer 112 receives the count value CV, and generates the data sequence DS1 and DS2 respectively having the electronic characteristic of the values determined according to the count value CV. In some embodiments of present disclosure, the output buffer 112 may compare the count value CV with one or more threshold value(s), and the electronic characteristic of the values may be set by the output buffer 112 according to the comparison result(s).

Figure 3:
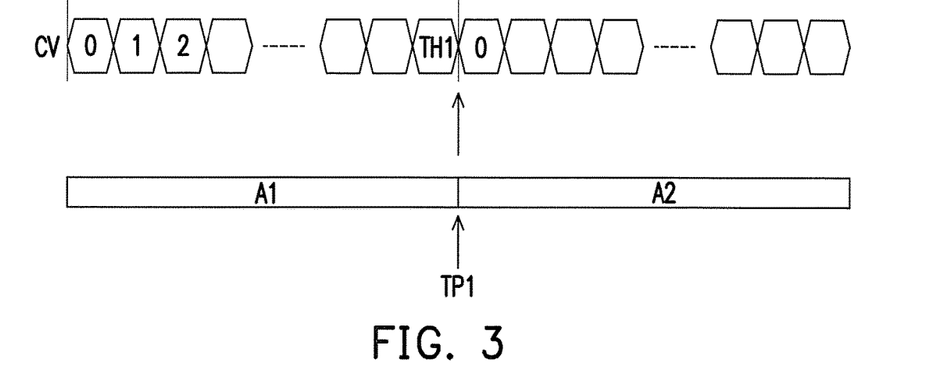
FIG. 3 illustrates a waveform plot of an electronic characteristic adjusting scheme according to an embodiment of present disclosure.
Figure 4:
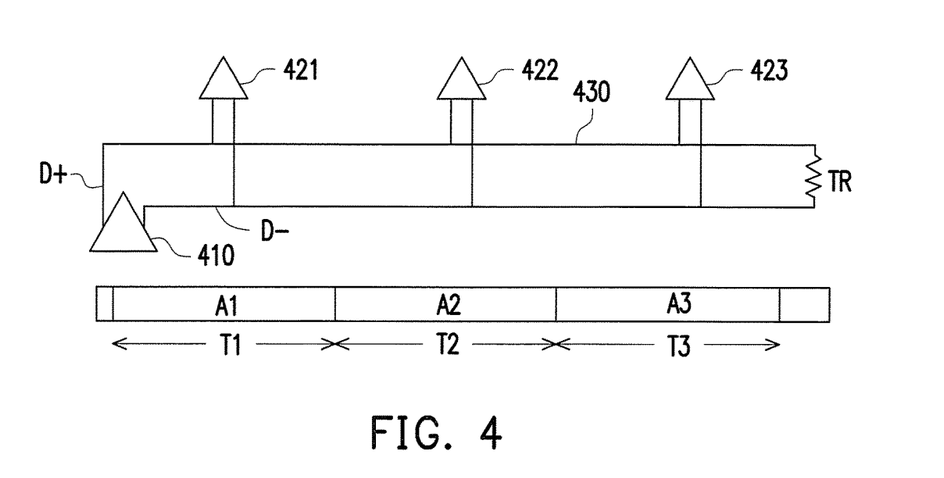
FIG. 4 illustrates a schematic diagram of an electronic characteristic adjusting scheme according to an embodiment of present disclosure.

Referring to FIG. 2 and FIG. 3, wherein FIG. 3 illustrates a waveform plot of an electronic characteristic adjusting scheme according to an embodiment of present disclosure. In FIG. 3, when the first data sequence DS1 having the electronic characteristic of the value A1 is in transmission, the counter 111 counts the display data DDAT to obtain the count value CV which may be an increasing value. When the count value CV reaches the threshold value TH1, the output buffer 112 may adjust the electronic characteristic to value A2 which is smaller than the value A1, at time point TP1, and another data sequence can be generated by the output buffer 112 according to the value A2 after the time point TP1. In additional, the counter 111 may reset the count value CV to 0 at the time point TP1. Subsequently, the counter 111 keeps counting the display data DDAT to obtain the count value CV when the second data sequence DS2 having the electronic characteristic of the value A2 is in transmission. When the count value CV reaches the threshold value TH1 again, the output buffer 112 may adjust the electronic characteristic to a value smaller than the value A2, for a transmission of a data sequence after the second data sequence DS2. Referring to FIG. 4, FIG. 4 illustrates a schematic diagram of an electronic characteristic adjusting scheme according to an embodiment of present disclosure. In FIG. 4, a signal transmitter 410 is coupled to signal receivers 421-423 through a bus 430. Among the signal receivers 421-423, the signal receiver 421 has the shortest signal transmission path to the signal transmitter 410 and the signal receiver 423 has the longest signal transmission path to the signal transmitter 410. The signal transmitter 410 may transmit display data by a pair of differential signals D+and D− through the bus 430, and a terminal resistor TR may be disposed on an end terminal of the bus 430. FIG. 4 shows only one data pair, and other data pairs and a clock pair are omitted. In a display data transmission operation, a first data sequence having an electronic characteristic of a value A1 is generated and transmitted to the signal receiver 421 during a time period T1. By counting the display data, the signal transmitter 410 can obtain a count value indicating the number of pixels (or sub-pixels) that the display data can drive and can determine that all of the first data sequence are transmitted to the signal receiver 421 at the end of the time period T1. After the time period T1, the signal transmitter 410 generates a second data sequence having an electronic characteristic of a value A2 smaller than the value A1 and transmits the second data sequence to the signal receiver 422 during a time period T2. Also, by counting the display data, the signal transmitter 410 can determine that all of the second data sequence are transmitted to the signal receiver 422 at the end of the time period T2. After the time period T2, the signal transmitter 410 generates a third data sequence having an electronic characteristic of a value A3 smaller than the value A2 transmits the third data sequence to the signal receiver 423 during a time period T3.

Besides, the signal transmitter 410 may insert a plurality of notification data in the data transmission to the signal receivers. For example, a first notification data may be inserted before the start of first data sequence, a second notification data may be inserted between the end of the first data sequence and the start of the second data sequence, and a third notification data may be inserted between the end of the second data sequence and the start of the third data sequence. Accordingly, the signal receiver 421 may start receiving the first data sequence by reference to the first notification data, the signal receiver 422 may start receiving the second data sequence by reference to the second notification data, and the signal receiver 423 may start receiving the third data sequence by reference to the third notification data.

Figure 5A:
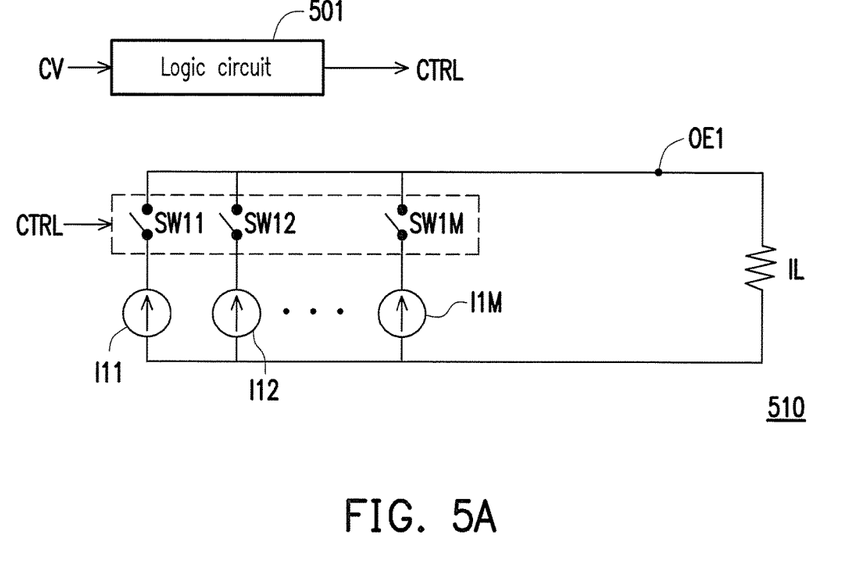
FIG. 5A and FIG. 5B illustrate a plurality of output buffers according to an embodiment of present disclosure.
Figure 5B:
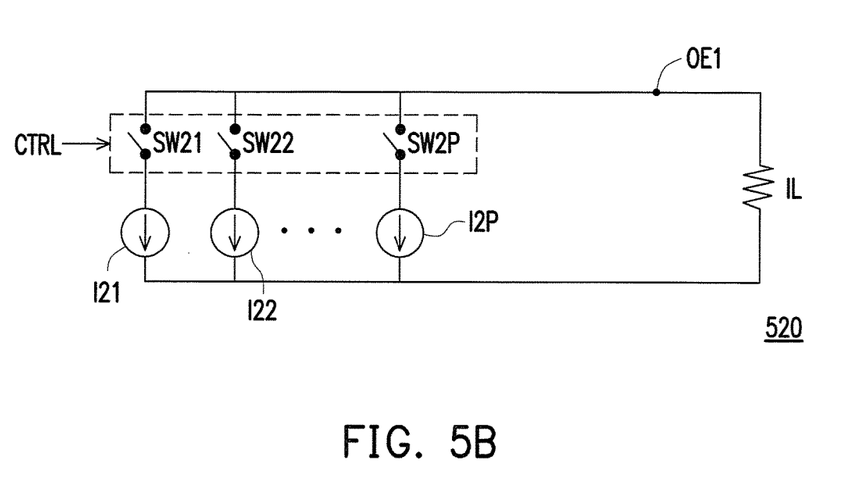

Referring to FIG. 5A and FIG. 5B, FIG. 5A and FIG. 5B illustrate output buffers according to an embodiment of present disclosure. In FIG. 5A, the output buffer 510 includes a logic circuit 501, a plurality of switches SW11-SW1M, and a plurality of current sources I11-I1M. The switches SW11-SW1M are coupled to an output end OE1, and the switches SW11-SW1M are also respectively coupled to the current sources I11-I1M. The logic circuit 501 receives a count value CV from a counter (such as the counter 111 in FIG. 2), and the logic circuit 501 generates a control signal CTRL according to the count value CV. The control signal CTRL has a plurality of sub-signals for respectively controlling the switches SW11-SW1M. The output end OE1 is coupled to a bus for transmitting the display data.

The number of the turned-on switches of the switches SW11-SW1M can be determined by the control signal CTRL. If the signal transmitter needs to generate a data sequence with larger source current, the control signal CTRL may turn on more switches of the SW11-SW1M, and if the signal transmitter needs to generate a data sequence with smaller source current, the control signal CTRL may turn on less switches of the SW11-SW1M.

Currents respectively provided by the current sources I11-I1M may be different or the same. The resistance IL is determined according to the impendence of the bus for transmitting the display data.

In FIG. 5B, the output buffer 520 includes a plurality of switches SW21-SW2P, and current sources I21-I2P. The switches SW21-SW2P are coupled to the output end OE1, and the switches SW21-SW2P are respectively coupled to the current sources I21-I2P. The output end OE1 is coupled to a bus for transmitting the display data.

In this embodiment, each of the current sources I21-I2P provides a sink current to the bus, and sink current of the data sequence can be determined. The number of the turned-on switches of the switches SW21-SW2P can be determined by the control signal CTRL. If the signal transmitter needs to generate a data sequence with larger sink current, the control signal CTRL may turn on more switches of the SW21-SW2P, and if the signal transmitter needs to generate a data sequence with smaller sink current, the control signal CTRL may turn on less switches of the SW21-SW2P. Beside, currents respectively provided by the current sources I21-I2P may be different or the same.

Figure 6:
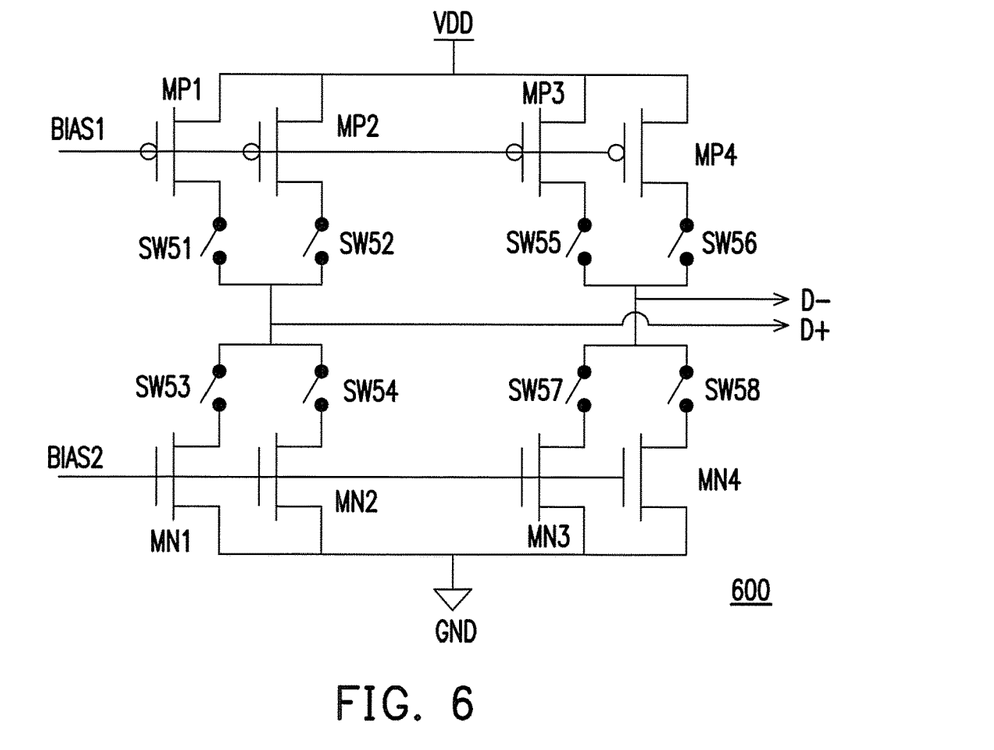
FIG. 6 illustrates a circuit diagram of an output buffer according to an embodiment of present disclosure.

Referring to FIG. 6, FIG. 6 illustrates a circuit diagram of an output buffer according to an embodiment of present disclosure. The output buffer 600 provides differential signals D+ and D−. The output buffer 600 includes a plurality of transistors MP1-MP4 and MN1-MN4 to form a plurality of current sources, and a plurality of switches SW51-SW58. The transistors MP1-MP4 are connected a power voltage VDD, and the transistors MN1-MN4 are coupled to a reference ground GND. The current sources respectively formed by the transistors MP1 and MP2 are used to provide source current to generate the differential signal D+, and the current sources respectively formed by the transistors MN1 and MN2 are used to provide sink current to generate the differential signal D+.

In the operation, in a first operation mode, at least one of the switches SW51 and SW52 is turned on for providing source current to generate the differential signal D+, and all of the switches SW53 and SW54 are cut-off In the first operation mode, at least one of the switches SW57 and SW58 is turned on for providing sink current to generate the differential signal D−, and all of the switches SW55 and SW56 are cut-off. The source current of the differential signal D+ can be determined by the switches SW51 and SW52 which are both turned on or only one of them are turned on, and the sink current of the differential signal D− can be determined by the switches SW57 and SW58 which are both turned on or only one of them are turned on. And in a second operation mode, at least one of the switches SW53 and SW54 is turned on for providing sink current to generate the differential signal D+, at least one of the switches SW55 and SW56 is turned on for providing source current to generate the differential signal D−, and all of the switches SW51, SW52, SW57 and SW58 are cut-off.

In additional, the transistors MP1-MP4 receive a bias voltage BIAS1 to generate currents, and the transistors MN1-MN4 receive another bias voltage BIAS2 to generate currents. The bias voltages BIAS1 and BIAS2 may be generated according a reference current by a current mirror circuit.

In another embodiment, an output buffer may include three or more PMOS transistors and corresponding three or more switches in place of MP1, MP2, SW51 and SW 52, and include three or more NMOS transistors and corresponding three or more switches in place of MN1, MN2, SW53 and SW 54, so as to provide three or more levels of source current. The output buffer may also provide sink current with more levels in the similar way. That is, the number of the transistors for providing source current or sink current to generate the differential signals D+ and D− is not limited to 2. The numbers of the transistors can be adjusted by a designer for necessary.

Figure 7:
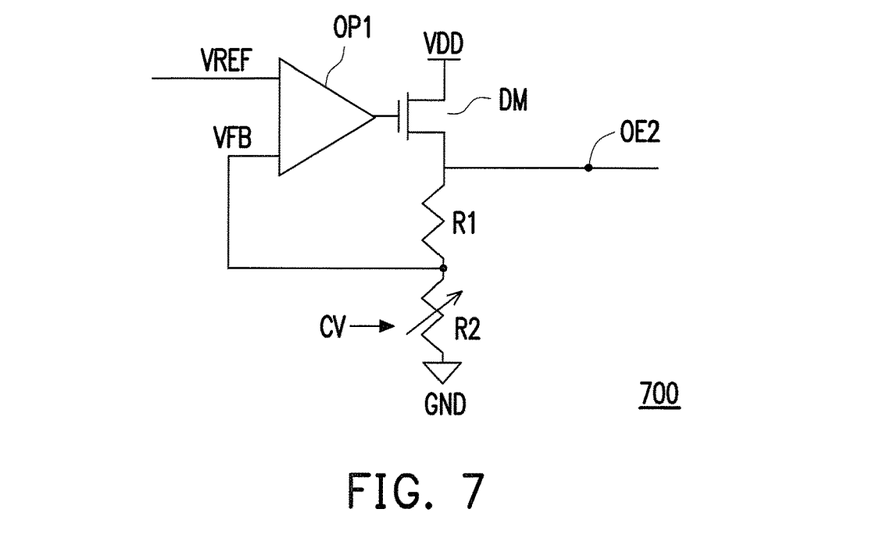
FIG. 7 illustrates a circuit diagram of another output buffer according to an embodiment of present disclosure.

Referring to FIG. 7, FIG. 7 illustrates a circuit diagram of another output buffer according to an embodiment of present disclosure. The output buffer includes a voltage generator 700. An output end OE2 of the voltage generator 700 is coupled to a bus for transmitting display data to signal receivers. The voltage generator 700 may be used to adjust a voltage swing value of the data sequence.

In this embodiment, the voltage generator 700 may be a low drop-out (LDO) voltage regulator. The voltage generator 700 includes an operation amplifier OP1, a transistor DM and resistors R1 and R2. The operation amplifier OP1 receives a reference voltage VREF and a feedback voltage VFB, and an output end of the operation amplifier OP1 is coupled to a control end of the transistor DM. The transistor DM receives the power voltage VDD, and is coupled the resistor R1. The resistor R2 is coupled between the resistor R1 and the reference round GND, and the feedback voltage VFB is generated at a coupling end of the resistors R1 and R2.

It should be noted here, a resistance of the resistor R2 may be adjusted according to the count value CV. That is, voltage level of an output voltage generated by the voltage generator 700 can be adjusted according to the count value CV.

Figure 8:
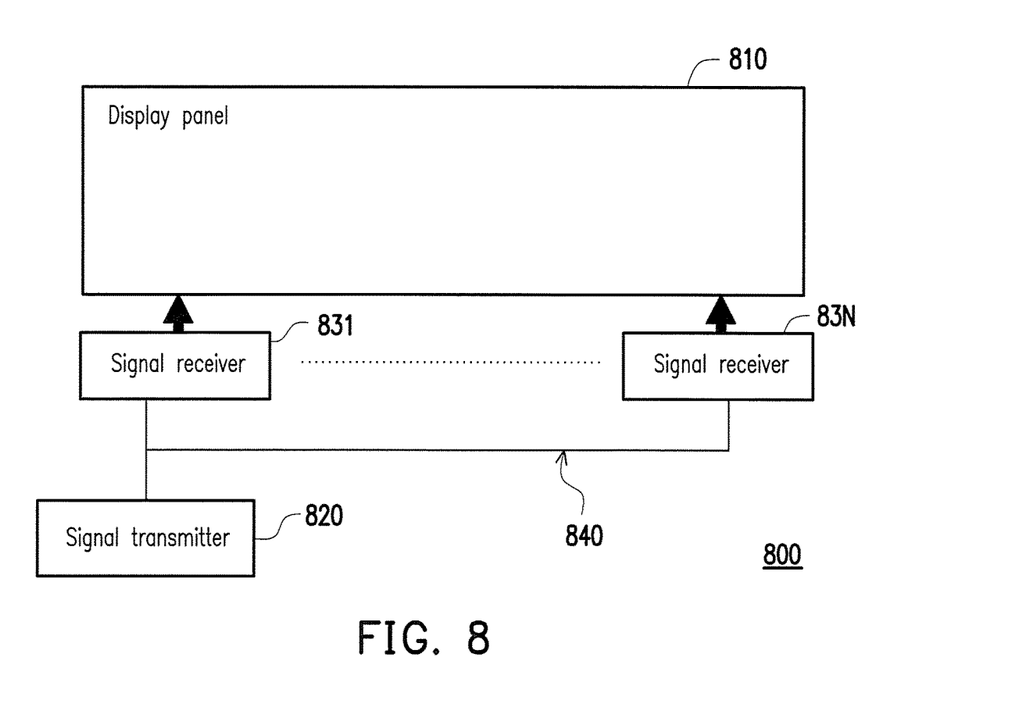
FIG. 8 illustrates a block diagram of a display apparatus according to an embodiment of present disclosure.

Referring to FIG. 8, FIG. 8 illustrates a block diagram of a display apparatus according to an embodiment of present disclosure. The display apparatus 800 includes a display panel 810, a plurality of signal receivers 831-83N, and a signal transmitter 820. In this embodiment, the signal transmitter 820 may be installed in a timing controller, and the signal receivers 831-83N may be installed in corresponding source drivers. The signal receivers 831-83N are coupled in series, and are coupled to the display panel 810. The signal receivers 831-83N provide a plurality of driving signals to drive the display panel 810. The signal transmitter 820 is coupled to the signal receivers 831-83N through a bus 840. The signal transmitter 820 is used to transmit display data to the signal receivers 831-83N, and the display data may include a first data sequence having an electronic characteristic of a first value to be transmitted to a first signal receiver of the signal receivers 831-83N through a relatively shorter signal transmission path, and include a second data sequence having the electronic characteristic of a second value to be transmitted to a second signal receiver of the signal receivers 831-83N through a relatively longer signal transmission path. The first and second values can be adjusted according to distances of signal transmission paths.

The signal transmitter 820 may be implemented by the embodiments mentioned above, and no more repeated descriptions here.

It should be noted that in another embodiment, a signal transmitter is not being installed in a timing controller but being as a transmitting interface of a signal generation device such as a TV controller or a graphics controller, and each of signal receivers can be installed in a corresponding integrated circuit wherein a timing controller and a source driver are integrated.

Figure 9:
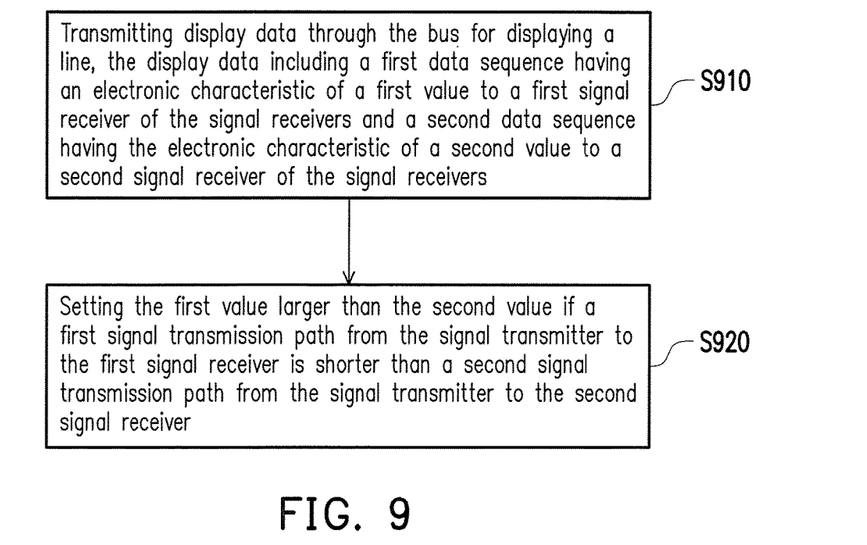
FIG. 9 illustrates a flow chart of data transmitting method for a display apparatus according to an embodiment of present disclosure.

Referring to FIG. 9, FIG. 9 illustrates a flow chart of data transmitting method for a display apparatus according to an embodiment of present disclosure. In step S910, display data is transmitted through a bus for displaying a line, and the display data includes a first data sequence having an electronic characteristic of a first value to a first signal receiver of the signal receivers and a second data sequence having the electronic characteristic of a second value to a second signal receiver of the signal receivers. The step S920 is executed by setting the first value larger than the second value if a first signal transmission path from the signal transmitter to the first signal receiver is shorter than a second signal transmission path from the signal transmitter to the second signal receiver.

Detail operations of the steps S910 and S920 are well defined in the descriptions mentioned in above embodiments, and no more repeated descriptions here.

In summary, present disclosure provides a signal transmitter, and the signal transmitter can adjust electronic characteristic of data sequence according to a distance of a signal transmission path. That is, output power consumption of the signal transmitter can be optimized, and power waste can be prevented correspondingly.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A signal transmitter, coupled to a plurality of signal receivers by a bus, and configured to transmit display data through the bus for displaying a line, the display data comprising a first data sequence which has an electronic characteristic of a first value and is transmitted to a first signal receiver of the signal receivers and a second data sequence which has the electronic characteristic of a second value and is transmitted to a second signal receiver of the signal receivers;
   a counter for counting the display data to obtain a count value; and
   an output buffer, coupled to the bus, for generating the first and second data sequences respectively having the electronic characteristic of the first and second values determined according to the count value,
   wherein a first signal transmission path from the signal transmitter to the first signal receiver is shorter than a second signal transmission path from the signal transmitter to the second signal receiver, and the first value is larger than the second value,
   wherein the signal transmitter respectively transmits the first data sequence and the second data sequence to the first signal receiver and the second signal receiver in different time periods through the same bus.

2. The signal transmitter according to claim 1, wherein the output buffer comprises:
   a plurality of switches, wherein each of the switches is turned on or cut off according to the count value; and
   a plurality of current sources, respectively coupled to the switches, wherein each of the current sources provides or sinks a current to the bus through corresponding switch.

3. The signal transmitter according to claim 2, wherein the output buffer further comprises:
   a logic circuit, receiving the count value and generating a plurality of control signals according to the count value,
   wherein, the control signals are respectively provided to the switches, and the switches are turned on or cut off respectively according to the control signals.

4. The signal transmitter according to claim 1, wherein the output buffer further comprises:
   a voltage generator, coupled to the bus, providing an output voltage to the bus according to the count value.

5. The signal transmitter according to claim 1, wherein the electronic characteristic comprises one of a source current, a sink current and a voltage swing of the display data.

6. A display apparatus, comprising:
   a display panel;
   a plurality of signal receivers which are series coupled, for respectively providing a plurality of source driving signals to drive the display panel;
   a signal transmitter, coupled to the signal receivers by a bus, and configured to:
   transmit display data for displaying a line through the bus, the display data comprising a first data sequence which has an electronic characteristic of a first value and is transmitted to a first signal receiver of the signal receivers and a second data sequence which has the electronic characteristic of a second value and is transmitted to a second signal receiver of the signal receivers; and a counter for counting the display data to obtain a count value; and an output buffer, coupled to the bus, for generating the first and second data sequences respectively having the electronic characteristic of the first and second values determined according to the count value, wherein a first signal transmission path from the signal transmitter to the first signal receiver is shorter than a second signal transmission path from the signal transmitter to the second signal receiver, and the first value is larger than the second value, wherein the signal transmitter respectively transmits the first data sequence and the second data sequence to the first signal receiver and the second signal receiver in different time periods through the same bus.

7. The display apparatus according to claim 6, wherein the output buffer comprises:

a plurality of switches, wherein each of the switches is turned on or cut off according to the count value; and a plurality of current sources, respectively coupled to the switches, wherein each of the current sources provides or sinks a current to the bus through corresponding switch.

8. The display apparatus according to claim 7, wherein the output buffer further comprises:

a logic circuit, receiving the count value and generating a plurality of control signals according to the count value, wherein, the control signals are respectively provided to the switches, and the switches are turned on or cut off respectively according to the control signals.

9. The display apparatus according to claim 7, wherein the output buffer further comprises:

a voltage generator, coupled to the bus, providing an output voltage to the bus according to the count value.

10. The display apparatus according to claim 6, wherein the electronic characteristic comprises one of a source current, a sink current and a voltage swing of the display data.

11. A data transmitting method for a display apparatus, comprising:

transmitting display data through a bus for displaying a line, the display data comprising a first data sequence which has an electronic characteristic of a first value and is transmitted to a first signal receiver of the signal receivers and a second data sequence which has the electronic characteristic of a second value and is transmitted to a second signal receiver of the signal receivers, where the first data sequence and the second data sequence are respectively transmitted to the first signal receiver and the second signal receiver through the same bus in different time periods; and setting the first value larger than the second value if a first signal transmission path from the signal transmitter to the first signal receiver is shorter than a second signal transmission path from the signal transmitter to the second signal receiver, wherein step of setting the first value larger than the second value if the first signal transmission path from the signal transmitter to the first signal receiver is shorter than the second signal transmission path from the signal transmitter to the second signal receiver comprises:

counting the displaying data to obtain a count value; and generating the first and second data sequences respectively having the electronic characteristic of the first and second values determined according to the count value.

* * * * *